United States Patent
Allain Najman et al.

(10) Patent No.: US 11,554,963 B2
(45) Date of Patent: Jan. 17, 2023

(54) PRECIPITATED SILICA AND PROCESS FOR ITS MANUFACTURE

(71) Applicant: RHODIA OPERATIONS, Paris (FR)

(72) Inventors: Emmanuelle Allain Najman, L'Hay les Roses (FR); Cédric Feral-Martin, Emerainville (FR); Pascaline Garbey, Saint Didier au Mont d'Or (FR); Laurent Guy, Sathonay-Camp (FR); Sylvaine Neveu, Paris (FR); Caroline Fayolle, Lyons (FR)

(73) Assignee: RHODIA OPERATIONS, Paris (FR)

( * ) Notice: Subject to any disclaimer, the term of this patent is extended or adjusted under 35 U.S.C. 154(b) by 455 days.

(21) Appl. No.: 16/611,163

(22) PCT Filed: May 3, 2018

(86) PCT No.: PCT/EP2018/061308
§ 371 (c)(1),
(2) Date: Nov. 5, 2019

(87) PCT Pub. No.: WO2018/202755
PCT Pub. Date: Nov. 8, 2018

(65) Prior Publication Data
US 2020/0189923 A1    Jun. 18, 2020

(30) Foreign Application Priority Data
May 5, 2017    (EP) ..................................... 17305511

(51) Int. Cl.
*C01B 33/193*    (2006.01)
*B01J 21/08*    (2006.01)

(52) U.S. Cl.
CPC ............. *C01B 33/193* (2013.01); *B01J 21/08* (2013.01); *C01P 2002/82* (2013.01); *C01P 2006/12* (2013.01); *C01P 2006/21* (2013.01)

(58) Field of Classification Search
CPC ................................ C01B 33/193; B01J 21/08
See application file for complete search history.

(56) References Cited

U.S. PATENT DOCUMENTS

| | | | |
|---|---|---|---|
| 2006/0093541 A1 | 5/2006 | Uhrlandt | |
| 2013/0178569 A1* | 7/2013 | Guy | ........................ B60C 1/00 106/483 |
| 2015/0030518 A1 | 1/2015 | Allain | |
| 2017/0073521 A1* | 3/2017 | Guy | ..................... C01B 33/193 |

FOREIGN PATENT DOCUMENTS

| | | |
|---|---|---|
| DE | 10322214 A1 | 12/2003 |
| FR | 2985990 A1 | 7/2013 |
| WO | 2011117400 A1 | 9/2011 |
| WO | 2011121129 A1 | 10/2011 |
| WO | 2013092745 A1 | 6/2013 |
| WO | 2015128404 A1 | 9/2015 |

OTHER PUBLICATIONS

Adsorption of pyridine on silica gels / Nikiel, Zerda, J. Phys. Chem., 1991, 4063.
Comprehensive Study of Surface Chemistry of MCM-41 Using 29Si CP/MAS NMR, FTIR, J. Phys. Chem. B, 1997, 6525.

* cited by examiner

*Primary Examiner* — James A Fiorito
(74) *Attorney, Agent, or Firm* — Osha Bergman Watanabe & Burton LLP

(57) ABSTRACT

A precipitated silica characterised by the presence of specific acid sites on its surface and a process for its manufacture.

19 Claims, No Drawings

PRECIPITATED SILICA AND PROCESS FOR ITS MANUFACTURE

This application is a U.S. national stage entry under 35 U.S.C. § 371 of International Application No. PCT/EP2018/061308 filed May 3, 2018, which claims priority to European application No. EP 17305511.2 filed on May 5, 2017, the whole content of these applications being incorporated herein by reference for all purposes.

TECHNICAL FIELD

The present invention relates to precipitated silica and to a process for its manufacture.

BACKGROUND ART

The use of precipitated silica as a reinforcing filler in polymeric compositions, as catalyst support, as anticaking agent, as rheology modifier or abrasive in toothpaste compositions is known.

There is always the need of precipitated silica which can be successfully used in multiple applications such as reinforcing filler in polymeric compositions and catalyst or catalyst support.

SUMMARY OF INVENTION

A first object of the present invention is to provide a novel precipitated silica which can be used in multiple applications, for instance as a catalyst or catalyst support as well as reinforcing filler in polymeric compositions. A second object of the invention is a process for the manufacture of the precipitated silica of the first object.

The inventive precipitated silica is characterised, among alia, by the presence of specific acid sites on its surface. The inventive silica is defined in detail in the description which follows and in the claims and the examples.

DESCRIPTION OF INVENTION

The precipitated silica of the invention is characterised by:
  an amount of at least one element M selected from the group consisting of B, Al, Ga and mixtures thereof in the range from 0.5 to 30.0 mol %; and
  an infrared absorption spectrum having at least one peak between 1538 and 1559 $cm^{-1}$ and at least one peak between 1612 and 1635 $cm^{-1}$, said spectrum having been measured after chemisorption with pyridine to saturation followed by treatment under vacuum at 25° C., wherein the ratio (area under the peak between 1538 and 1559 $cm^{-1}$)/(the area under the peak between 1612 and 1635 $cm^{-1}$) is at least 1.20.

The use of pyridine adsorption for studying the nature of silica surfaces by means of infrared techniques has been previously described, see for instance Nikiel, L.; Zerda, T.; *J. Phys. Chem.*, 1991, 95, 4063 and Zaho, X. S. et al.; *J. Phys. Chem. B*, 1997, 101, 6525. The technique allows distinguishing between different SiOH sites in the silica structure.

Precipitated silica containing aluminium has been previously described, for instance in WO2015/128404 A1 and in WO2011/117400 A1. The infrared spectrum of the precipitated silica disclosed in these prior art documents, measured after chemisorption with pyridine to saturation followed by treatment under vacuum at 25° C., does not exhibit any peak between 1538 and 1559 $cm^{-1}$.

Advantageously, the precipitated silica is characterised by
  an amount of at least one element M selected from the group consisting of B, Al, Ga and mixtures thereof in the range from 0.5 to 30.0 mol %;
  an infrared absorption spectrum having at least one peak between 1538 and 1559 $cm^{-1}$ and at least one peak between 1612 and 1635 $cm^{-1}$, said spectrum having been measured after chemisorption with pyridine to saturation followed by treatment under vacuum at 25° C., wherein the area under the peak between 1538 and 1559 $cm^{-1}$ is at least 0.02 $cm^{-1}$ and the ratio (area under the peak between 1538 and 1559 $cm^{-1}$)/(area under the peak between 1612 and 1635 $cm^{-1}$) is at least 1.20.

In the present specification, the terms "silica" and "precipitated silica" are used as synonyms.

The inventive silica contains at least one element M selected from the group consisting of B, Al, Ga and mixtures thereof. The at least one element M is present in an amount in the range from 0.5 to 30.0 mol %. Throughout the present text the amount of element M is defined as the amount of at least one element M by moles with respect to the moles of silica.

Element M is preferably selected from the group consisting of Al and Ga. More preferably, element M is Al. Other elements can be contained in the inventive silica.

The amount of element M in the inventive silica is preferably at least 1.0 mol %, at least 1.2 mol %, even at least 2.0 mol %. The amount of element M typically does not exceed 25.0 mol %, preferably it does not exceed 20.0 mol %, more preferably it does not exceed 15.0 mol %.

The precipitated silica of the invention is characterised by the presence of acid sites on its surface which are capable of forming bonds with pyridine and which can still be detected by infrared spectroscopy after treatment under vacuum at 25° C. as detailed hereafter.

Thus, the inventive precipitated silica is characterised by an infrared absorption spectrum after chemisorption with pyridine to saturation followed by treatment under vacuum at 25° C. having at least one peak between 1538 and 1559 $cm^{-1}$ and at least one peak between 1612 and 1635 $cm^{-1}$. End values are included in the definition of the ranges in the infrared absorption spectrum.

The expression "at least one peak between X and Y $cm^{-1}$" is used herein to indicate that the maximum of one absorption band is present in the area of the infrared absorption spectrum between X and Y $cm^{-1}$.

For the avoidance of doubts, the infrared absorption spectrum of the inventive precipitated silica comprises other peaks in addition to the peaks between 1538 and 1559 $cm^{-1}$ and between 1612 and 1635 $cm^{-1}$.

The peaks in the infrared absorption spectrum are determined on a silica sample submitted to the following conditions: treatment under vacuum ($10^{-5}$ Pa) for 1 hour at 25° C.; treatment at 180° C. under vacuum ($10^{-5}$ Pa) for 2 hours; introduction of gaseous pyridine (at 670 Pa) for 5 min at 25° C. to reach saturation; desorption of pyridine at 25° C. under vacuum ($10^{-5}$ Pa) over a period of 30 min.

The presence of a peak around 1541 $cm^{-1}$ has been associated with the formation of protonated pyridinium species, whereas the presence of a peak around 1622 $cm^{-1}$ has been associated with the coordination of pyridine with the silica surface. Both bands are indicative of the presence of specific acid sites on the silica surface.

The area of the peak between 1538 and 1559 cm$^{-1}$ is at least 0.02 cm$^{-1}$. It is typically at least 0.05 cm$^{-1}$, generally at least 0.06 cm$^{-1}$, and even at least 0.07 cm$^{-1}$.

The area of the peak between 1612 and 1635 cm$^{-1}$ is typically greater than 0.01 cm$^{-1}$. It is generally at least 0.02 cm$^{-1}$ and preferably at least 0.04 cm$^{-1}$. In any event the ratio (area under the peak between 1538 and 1559 cm$^{-1}$)/(area under the peak between 1612 and 1635 cm$^{-1}$) is at least 1.20.

The ratio (area under the peak between 1538 and 1559 cm$^{-1}$)/(area under the peak between 1612 and 1635 cm$^{-1}$) can be equal to or greater than 1.30. The ratio (area under the peak between 1538 and 1559 cm$^{-1}$)/(area under the peak between 1612 and 1635 cm$^{-1}$) is not particularly limited. In some embodiments, the ratio (area under the peak between 1538 and 1559 cm$^{-1}$)/(area under the peak between 1612 and 1635 cm$^{-1}$) can be in the range from 1.20 to 5.00, even from 1.20 to 10.00.

The inventive silica is further characterised by a BET surface area $S_{BET}$ in the range from 40 to 800 m$^2$/g. The BET surface area $S_{BET}$ is at least 50 m$^2$/g. The BET surface area $S_{BET}$ may be conveniently greater than 60 m$^2$/g. The BET surface area $S_{BET}$ can be less than 700 m$^2$/g, preferably less than 500 m$^2$/g, more preferably less than 450 m$^2$/g.

Advantageously the inventive precipitated silica may have a BET surface area $S_{BET}$ in the range from 50 to 450 m$^2$/g, preferably from 60 to 400 m$^2$/g.

In an advantageous embodiment, the precipitated silica of the invention is characterised by:
  a BET surface area $S_{BET}$ in the range from 40 to 800 m$^2$/g;
  an amount of at least one element M selected from the group consisting of B, Al, Ga and mixtures thereof in the range from 0.5 to 30.0 mol %;
  an infrared absorption spectrum having at least one peak between 1538 and 1559 cm$^{-1}$ and at least one peak between 1612 and 1635 cm$^{-1}$, said spectrum having been measured after chemisorption with pyridine to saturation followed by treatment under vacuum at 25° C., wherein the ratio (area under the peak between 1538 and 1559 cm$^{-1}$)/(area under the peak between 1612 and 1635 cm$^{-1}$) is at least 1.20.

Preferably the area under the peak between 1538 and 1559 cm$^{-1}$ is at least 0.02 cm$^{-1}$. More preferably the area under the peak between 1538 and 1559 cm$^{-1}$ is at least 0.02 cm$^{-1}$ and the area under the peak between 1612 and 1635 cm$^{-1}$ is at least 0.01 cm$^{-1}$.

In another advantageous embodiment the precipitated silica of the invention is characterised by:
  a BET surface area $S_{BET}$ in the range from 50 to 450 m$^2$/g;
  an amount of at least one element M selected from the group consisting of Al and Ga in the range from 1.0 to 25.0 mol %;
  an infrared absorption spectrum having at least one peak between 1538 and 1559 cm$^{-1}$ and at least one peak between 1612 and 1635 cm$^{-1}$, said spectrum having been measured after chemisorption with pyridine to saturation followed by treatment under vacuum at 25° C., and wherein the area under the peak between 1538 and 1559 cm$^{-1}$ is at least 0.02 cm$^{-1}$ and the ratio (area under the peak between 1538 and 1559 cm$^{-1}$)/(area under the peak between 1612 and 1635 cm$^{-1}$) is at least 1.20.

More preferably the area under the peak between 1538 and 1559 cm$^{-1}$ is at least 0.05 cm$^{-1}$ and the area under the peak between 1612 and 1635 cm$^{-1}$ is at least 0.01 cm$^{-1}$.

A second object of the invention is a process for preparing the inventive precipitated silica. The process comprises the reaction of a silicate with an acid to produce a suspension of precipitated silica, said reaction comprising at least one step wherein either a silicate or at least one compound of element M is added to the reaction medium while the reaction medium is at a pH from 2.0 to 6.0, preferably from 3.0 to 5.0, and wherein the at least one compound of element M is added to the reaction medium before 50% by weight of the total amount of silicate required for the reaction is added to the reaction medium. The total amount of the at least one element M is added to the reaction medium before the addition of 50% by weight of the total amount of silicate required for the reaction has been added thereto.

The total amount of silicate to obtain a given final amount of silica can be determined by the person skilled in the art at the beginning of the process according to common general knowledge.

The reaction comprises the addition of silicate and the addition of at least one compound of element M to the reaction medium with the proviso that either the silicate or the at least one compound of element M is added to the reaction medium at a pH from 2.0 to 6.0.

It has been found that an important condition to promote the formation of acidic sites on the surface of the inventive silica is the presence of a step at acidic pH, namely from 2.0 to 6.0, preferably from 3.0 to 5.0. On the other hand the distribution of acidic sites, identified by the peaks between 1538 and 1559 cm$^{-1}$ and those between 1612 and 1635 cm$^{-1}$, is influenced by the stage when the compound of element M is introduced into the reaction medium.

In an advantageous embodiment of the inventive process, the at least one compound of element M is added to the reaction medium while the pH is in the range from 2.0 to 6.0, preferably from 3.0 to 5.0.

In one embodiment, the at least one compound of element M is added to the reaction medium before any amount of silicate is added to the reaction medium.

In other embodiments, the at least one compound of element M is added to the reaction medium before 10%, 20%, 30%, 40%, 45% by weight of the total amount of silicate required for the reaction is added to the reaction medium.

The term "silicate" is used herein to refer to one or more than one silicate which can be added during the course of the inventive process. The term "silicate" is used herein to refer to a compound selected from the group consisting of the alkali metal silicates. Advantageously it is selected from the group consisting of sodium and potassium silicate. The silicate may be in any known form, such as metasilicate or disilicate.

In the case where sodium silicate is used, the latter generally has an SiO$_2$/Na$_2$O weight ratio of between 2.0 and 4.0, in particular between 2.4 and 3.9, for example between 3.1 and 3.8.

The silicate may have a concentration (expressed in terms of SiO$_2$) of between 3.9 wt % and 25.0 wt %, for example between 5.6 wt % and 23.0 wt %, in particular between 5.6 wt % and 20.7 wt %.

The term "acid" is used herein to refer to one or more than one acid which can be added during the course of the inventive process. Any acid may be used in the process. Use is generally made of a mineral acid, such as sulfuric acid, nitric acid or hydrochloric acid, or of an organic acid, such as acetic acid, formic acid or carbonic acid. Sulfuric acid is preferred.

The acid may be metered into the reaction medium in diluted or concentrated form. The same acid at different concentrations may be used in different stages of the process.

In a preferred embodiment of the process sulfuric acid and sodium silicate are used in all the stages of the process. Element M is selected from the group consisting of B, Al, Ga and mixtures thereof. Element M is preferably selected from the group consisting of Al and Ga. More preferably, element M is Al.

Any compound of element M may be used in the process of the invention provided it is soluble in water. The at least one compound of element M is typically added into the reaction medium in the form of a solution, typically an aqueous solution.

Notable examples of suitable compound include but are not limited to nitrates, chlorides and sulfates.

When element M is Al, suitable compounds are for instance aluminum sulfate, aluminum nitrate and alkali metal aluminates. Preferably, the compound is selected from the group consisting of the alkali metal aluminates, in particular potassium aluminate or, more preferably, sodium aluminate.

The definitions and preferences provided above also apply to the specific embodiments of the process described hereafter.

In an advantageous embodiment, the inventive process comprises the steps of:
(i) providing a starting solution having a pH equal to or greater than 7.0;
(ii) reducing the pH of the reaction medium to a value lower than 7.0 by either simultaneously adding a silicate and an acid or by adding an acid to said starting solution; and
(iii) simultaneously adding to the reaction medium a silicate and an acid, such that the pH of the reaction medium is maintained in the range from 2.0 to 6.0 to obtain a suspension of precipitated silica, wherein at least one compound of element M is added to the reaction medium during at least one of steps (i), (ii) and (iii) with the proviso that such addition takes place before 50% by weight of the total amount of silicate required for the reaction has been added to the reaction medium.

In step (i) of the process a starting solution having a pH equal to or greater than 7.0 is provided in the reaction vessel. The starting solution is an aqueous solution, that is the solvent is water.

Typically, the starting solution has a pH of between 8.0 and 13.0, especially between 8.0 and 12.0.

The starting solution may be obtained by adding a base, e.g. NaOH, to water so as to obtain a pH value as detailed above.

Alternatively, the starting solution may contain a silicate. In such a case it may be obtained by adding acid to a mixture of water and silicate to obtain a pH equal to or greater than 7.0.

The starting solution may also containing preformed silica particles at a pH equal to or greater than 7.0.

The starting solution of step (i) may comprise one or more electrolyte. Preferably, the starting solution contains an electrolyte. The term "electrolyte" is used herein in its generally accepted meaning, i.e. to identify any ionic or molecular substance which, when in solution, decomposes or dissociates to form ions or charged particles. Mention may be made of salts selected from the group consisting of the salts of alkali metals and alkaline-earth metals. Advantageously, the electrolyte for use in the starting solution is the salt of the metal of the starting silicate and of the acid used in the process. Notable examples are for example sodium chloride in the case of the reaction of a sodium silicate with hydrochloric acid or, preferably, sodium sulfate in the case of the reaction of a sodium silicate with sulfuric acid. The electrolyte does not contain element M.

Preferably, when sodium sulfate is used as electrolyte in step (i), its concentration in the starting solution is between 8 and 40 g/L, especially between 10 and 35 g/L, for example between 13 and 30 g/L.

The at least one compound of element M may be present in or added to the starting solution.

In step (ii) the pH of the reaction medium is reduced to a value lower than 7.0 by either simultaneously adding a silicate and an acid or by adding an acid to said starting solution.

In one aspect of said embodiment, step (ii) comprise a simultaneous addition of an acid and of a silicate to the starting solution to lower the pH of the reaction medium to less than 7.0. The rates of addition of the acid and of the silicate during step (ii) are controlled in such a way that the average pH of the reaction medium is lowered to less than 7.0. The pH of the reaction medium is preferably between 7.0 and 2.0, especially between 6.0 and 2.0.

In such an aspect of the process, step (iii) is a continuation of step (ii) and it may be carried out under the same or different reaction conditions, such as different pH, different rate of addition of reagents.

In a second aspect of said embodiment, step (ii) of the process comprise an addition of an acid to the starting solution to lower the pH of the reaction medium to less than 7.0, typically to a pH value between 7.0 and 2.0 typically between 6.0 and 2.0.

Step (iii) then comprises a simultaneous addition of an acid and of a silicate to the reaction medium obtained at the end of step (ii). The rates of addition of the acid and of the silicate during step (ii) are controlled in such a way that the average pH of the reaction medium is maintained between 2.0 and 6.0. The pH of the reaction medium is preferably maintained between 2.5 and 5.5, especially between 3.0 and 5.0. In certain embodiments of the inventive process the pH is maintained to a constant value during step (iii) or it can vary.

A suspension of precipitated silica can be obtained at the end of step (iii). The precipitated silica can then be filtered and dried.

The process may comprise additional steps. The process may additionally comprise the steps of:
(iv) increasing the pH of the reaction medium to a value equal or greater than 7.0;
(v) simultaneously adding an acid and a silicate in such a way that the pH of the reaction medium is maintained in the range from 7.0 to 10.0, preferably from 7.5 to 9.5; and
(vi) stopping the addition of silicate while continuing the addition of acid to reach a pH of the reaction medium of less than 6.0.

The pH of the reaction medium during step (iv) can be increased to the required value either by the addition of a silicate or a base, e.g. NaOH.

After this step it may be advantageous to perform a maturing step of the reaction medium. This step is preferably carried out at the pH obtained at the end of step (iv). The maturing step may be carried out while stirring the reaction medium. The maturing step is preferably carried out under stirring of the reaction medium over a period of for example, 2 to 45 minutes, in particular from 5 to 25 minutes. Preferably the maturing step does not comprise any addition of acid or silicate.

After step (iv) and the optional maturing step, a new simultaneous addition of acid and silicate is performed, such that the pH of the reaction medium is maintained between 7.0 and 10.0, preferably between 7.5 and 9.5.

This second simultaneous addition of acid and silicate (step (v)) is advantageously performed in such a manner that the pH value of the reaction medium is maintained equal to the pH reached at the end of the preceding step (to within ±0.2 pH units), step (iv).

In step (vi), the addition of the silicate is stopped while continuing the addition of acid to the reaction medium so as to obtain a pH value in the reaction medium of less than 6.0, preferably between 3.0 and 5.5, in particular between 3.0 and 5.0, for example between 3.0 and 4.5. A suspension of precipitated silica is obtained in the reaction vessel.

At the end of step (vi), and thus after stopping the addition of acid to the reaction medium, a second maturing step may advantageously be carried out. This second maturing step may be carried out under the same conditions as those described above for the maturing step which may be optionally carried out between step (iii) and (iv) of the process.

The at least one compound of element M is metered into the reaction medium in at least one of steps (i), (ii), (iii) and (iv) with the proviso that said addition takes place before 50% of the total amount of silicate is added to the reaction medium.

The at least one compound of element M is preferably metered into the reaction medium in at least one of steps (i), (ii) and (iii) with the proviso that said addition takes place before 50% of the total amount of silicate is added to the reaction medium.

Regardless of the stage of addition of the at least one compound of element M, the cumulative amount of said compound metered into the reaction medium is such that the amount of M in the precipitated silica is between 0.5 to 30.0 mol %. The rates of addition of compound of element M can be adapted to obtain the desired content of M in the precipitated silica by means known to the person skilled in the art.

In a first preferred embodiment, the at least one compound of element M is added to the reaction medium during step (i), that is element M is present in the initial aqueous solution. All of the required amount of element M is added, or present, in the reaction medium at step (i). The initial aqueous solution may additionally contain an electrolyte as described above.

In a second preferred embodiment, the at least one compound of element M is added to the reaction medium during step (iii), that is during the simultaneous addition of acid and silicate to the starting solution, the pH being maintained in the range from 2.0 to 6.0, preferably from 3.0 to 5.0.

The compound of element M may be metered to the reaction medium over the whole duration of step (ii), that is simultaneously as the addition of acid and silicate. Alternatively, it may be metered during only one part of step (ii), for instance only after a first simultaneous addition of acid and silicate has taken place.

The at least one compound of element M may be added to the reaction medium only in one of steps (i), (ii), (iii) and (iv), or, alternatively, in more than one step, provided the complete addition is stopped before 50% of the total amount of silicate is fed to the reaction medium.

The reaction vessel in which the entire reaction of the silicate with the acid is performed is usually equipped with adequate stirring and heating equipment.

The entire reaction of the silicate with the acid is generally performed at a temperature of between 40 and 96° C., in particular between 80 and 95° C.

According to one variant of the invention, the entire reaction of the silicate with the acid is performed at a constant temperature, usually of between 40 and 96° C., in particular between 80 and 95° C.

According to another variant of the invention, the temperature at the end of the reaction is higher than the temperature at the start of the reaction: thus, the temperature at the start of the reaction is preferably maintained at between 40 and 80° C. and the temperature is then increased, preferably up to a value of between 80 and 96° C., at which value it is maintained up to the end of the reaction.

At the end of the steps that have just been described, a suspension of precipitated silica is obtained, which is subsequently separated (liquid/solid separation). The process in all of its embodiments, thus typically comprises a further step of filtering the suspension of precipitated silica and drying the precipitated silica.

The separation usually comprises a filtration, followed by washing, if necessary. The filtration is performed according to any suitable method, for example by means of a belt filter, a rotary filter, for example a vacuum filter, or, preferably a filter press.

The filter cake is then subjected to a liquefaction operation. The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill. Optionally, the liquefaction step may be carried out by subjecting the filter cake to a chemical action, for instance by addition of water or an acid. The mechanical and chemical treatments may be both carried out. The suspension of precipitated silica which is obtained after the liquefaction step is subsequently dried.

Drying may be performed according to means known in the art. Preferably, the drying is performed by atomization. To this end, use may be made of any type of suitable atomizer, in particular a turbine, nozzle, liquid pressure or two-fluid spray-dryer. In general, when the filtration is performed using a filter press, a nozzle spray-dryer is used, and when the filtration is performed using a vacuum filter, a turbine spray-dryer is used.

When the drying operation is performed using a nozzle spray-dryer, the precipitated silica that may then be obtained is usually in the form of substantially spherical beads. After this drying operation, it is optionally possible to perform a step of milling or micronizing on the recovered product; the precipitated silica that may then be obtained is generally in the form of a powder.

When the drying operation is performed using a turbine spray-dryer, the precipitated silica that may then be obtained may be in the form of a powder.

Finally, the dried, milled or micronized product as indicated previously may optionally be subjected to an agglomeration step, which consists, for example, of direct compression, wet granulation (i.e. with use of a binder, such as water, silica suspension, etc.), extrusion or, preferably, dry compacting.

The precipitated silica that may then be obtained via this agglomeration step is generally in the form of granules.

The inventive precipitated silica can be used in a number of applications, such as catalyst, catalyst support, absorbent for active materials (in particular support for liquids, especially used in food, such as vitamins (vitamin E or choline chloride), as viscosity modifier, texturizing or anticaking agent, or as additive for toothpaste, concrete or paper. The inventive silica may also conveniently be used in the manufacture of thermally insulating materials or in the preparation of resorcinol-formaldehyde/silica composites The inventive precipitated silica finds a particularly advantageous application as filler in polymeric compositions. The at least one polymer can be selected among the thermosetting polymers and the thermoplastic polymers. Notable, non-limiting examples of thermosetting polymers include thermosetting resins such as epoxy resins, unsaturated polyester resins, vinyl ester resins, phenolic resins, epoxy acrylate resins, urethane acrylate resins, phenoxy resins, alkyd resins, urethane resins, maleimide resins, and cyanate resins.

Notable, non-limiting examples of suitable thermoplastic polymers include styrene-based polymers such as polystyrene, (meth)acrylic acid ester/styrene copolymers, acrylonitrile/styrene copolymers, styrene/maleic anhydride copolymers, ABS, ASA, and AES; acrylic polymers such as polymethylmethacrylate; polycarbonates; polyamides; polyesters, such as polyethylene terephthalate and polybutylene terephthalate; polyphenylene ethers; polysulfones; polyaryletherketones; polyphenylene sulfides; thermoplastic polyurethanes; polyolefins such as polyethylene, polypropylene, polybutene, poly-4-methylpentene, ethylene/propylene copolymers, ethylene/α-olefins copolymers; copolymers of α-olefins and various monomers, such as ethylene/vinyl acetate copolymers, ethylene/(meth)acrylic acid ester copolymers, ethylene/maleic anhydride copolymers, ethylene/acrylic acid copolymers; aliphatic polyesters such as polylactic acid, polycaprolactone, and aliphatic glycol/aliphatic dicarboxylic acid copolymers.

The inventive silica may advantageously be employed as reinforcing filler in elastomeric compositions. Accordingly a preferred object of the invention is a composition comprising the inventive silica and one or more elastomers, preferably exhibiting at least one glass transition temperature between −150° C. and +300° C., for example between −150° C. and +20° C.

Notable non-limiting examples of suitable elastomers are diene elastomers. For example, use may be made of elastomers deriving from aliphatic or aromatic monomers, comprising at least one unsaturation such as, in particular, ethylene, propylene, butadiene, isoprene, styrene, acrylonitrile, isobutylene or vinyl acetate, polybutyl acrylate, or their mixtures. Mention may also be made of functionalized elastomers, that is elastomers functionalized by chemical groups positioned along the macromolecular chain and/or at one or more of its ends (for example by functional groups capable of reacting with the surface of the silica), and halogenated polymers. Mention may be made of polyamides, ethylene homo- and copolymer, propylene homo- and copolymer.

Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur or crosslinked, in particular with peroxides or other crosslinking systems (for example diamines or phenolic resins).

In general, the polymer compositions additionally comprise at least one (silica/polymer) coupling agent and/or at least one covering agent; they can also comprise, inter alia, an antioxidant.

Notable non-limiting examples of coupling agents are for instance "symmetrical" or "unsymmetrical" silane polysulfides; mention may more particularly be made of bis((C1-C4)alkoxyl(C1-C4)alkylsilyl(C1-C4)alkyl) polysulfides (in particular disulfides, trisulfides or tetrasulfides), such as, for example, bis(3-(trimethoxysilyl)propyl) polysulfides or bis (3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer. It can also be employed in the free state (that is to say, not grafted beforehand) or grafted at the surface of the silica. It is the same for the optional covering agent.

The coupling agent can optionally be combined with an appropriate "coupling activator", that is to say a compound which, mixed with this coupling agent, increases the effectiveness of the latter.

The proportion by weight of the inventive silica in the polymer composition can vary within a fairly wide range. It normally represents from 10% to 200%, in particular from 20% to 150%, especially from 20% to 80% (for example from 30% to 70%) or from 80% to 120% (for example from 90% to 110%), of the amount of the polymer(s).

The silica according to the invention can advantageously constitute all of the reinforcing inorganic filler and even all of the reinforcing filler of the polymer composition.

The compositions comprising the precipitated silica of the invention may be used for the manufacture of a number of articles. Non-limiting examples of finished articles comprising at least one of the polymer compositions described above, are for instance of footwear soles, floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, tires, battery separators, conveyor belts, or transmission belts.

Should the disclosure of any patents, patent applications, and publications which are incorporated herein by reference conflict with the description of the present application to the extent that it may render a term unclear, the present description shall take precedence.

Analytical Methods

The physicochemical properties of the precipitated silica of the invention were determined using the methods described hereafter.

BET Surface Area

BET surface area was determined according to the Brunauer-Emmett-Teller method as detailed in standard NF ISO 5794-1, Appendix E (June 2010) with the following adjustments: the sample was pre-dried at 160° C.±10° C., the partial pressure (P/Po) used for the measurement was between 0.05 and 0.20.

CTAB Surface Area

The CTAB surface area was determined according to standard NF ISO 5794-1, Appendix G (June 2010).

Determination of Content of Element M

The content of element M was determined by means of ICP OES (inductively coupled plasma optical emission spectrometry) after digestion of the sample in fluorhydric acid (eg. 0.2-0.3 g of $SiO_2$ with 1 mL of fluorhydric acid 40%). The limpid solution was diluted in a 5% nitric acid aqueous solution according to the expected concentration of element M (e.g. dilution by a factor of 1500 for an amount of 0.3%). The intensity measured at the specific wavelength of element M (e.g. 396.152 nm for Al; 249.773 nm for B and 233.527 nm for Ga) was compared to a calibration curve in the range of 0.05 to 2.00 mg/L of standards obtained in similar analytical conditions.

The amount in the solid was obtained by calculation using the dilution factor and the dry extract of the silica measured.

Determination of Residual Sulfates in Silica

Sulfate was determined by measuring the sulfur in silica by ICP OES (inductively coupled plasma optical emission spectrometry) after digestion of the sample in fluorhydric acid (eg. 0.2-0.3 g of silica with 1 mL of fluorhydric acid 40%). The limpid solution was diluted in a nitric acid 5% aqueous solution according to the expected sulfur concentration (e.g. dilution by a factor of 1500 for an amount of 0.5% $SO_4$). The intensity measured on the sulfur specific wavelength (e.g. 180.672 and 181.975 nm) was compared to a calibration curve in the range of 0.05 to 2.00 mg/L of sulfur standards obtained in similar analytical conditions in order to measure the amount in the diluted solution. The amount of sulfate in the solid is obtained by calculation using the molecular weight ratio between sulfur and sulfate, the dilution factor and the dry extract of the silica.

Infrared Spectroscopy

The analysis is performed on silica samples having a $Na_2SO_4$ content between 0.2 and 0.6% by weight and an amount of other anions (such as $Cl^-$, $Br^-$, $I^-$, $NO_3^-$, $PO_4^{3-}$) not exceeding 0.015% by weight for each individual anion. Samples containing higher amounts of $Na_2SO_4$ should be washed with water to reduce the amount of salt to the level 0.2-0.6% by weight. Samples containing other salts, e.g. chlorides, nitrites etc., in amounts greater than 0.015% by weight (measured on the anion) should be washed to reduce the content of the residual anion to below 0.015% by weight and $Na_2SO_4$ should be added to obtain a value of between 0.2 and 0.6% by weight. An appropriate quantity of $Na_2SO_4$ should be added to the washing water in order to obtain a value of between 0.2 and 0.6% by weight after drying. Pure products should be suspended in aqueous solution of $Na_2SO_4$ with the appropriate concentration in order to obtain a value of between 0.2 and 0.6% by weight after drying.

Equipment and Sample Preparation:

The surface infrared analysis (by absorbance) was carried out on a Bruker Equinox 55 FTIR spectrometer on a pellet of pure product. The pellet was obtained after grinding the silica as is in an agate mortar and pelleting at 2 T/cm² for 10 seconds. The diameter of the pellet is generally 17 mm. The weight of the pellet was between 10 and 20 mg.

Spectra Acquisition

The pellet was placed in the high vacuum chamber ($10^{-5}$ Pa) of the spectrometer. Acquisition took place under high vacuum (acquisition conditions: from 400 $cm^{-1}$ to 6000 $cm^{-1}$; number of scans: 100; resolution: 2 $cm^{-1}$). A background spectrum was recorded, a spectrum was recorded after each step 1 to 5 performed at the temperature and pressure conditions as described hereafter:

1. 25° C. at atmospheric pressure;
2. 25° C. under vacuum ($10^{-5}$ Pa) for 1 hour (desorption of the residual water);
3. 180° C. under vacuum ($10^{-5}$ Pa) for 2 hours.
4. Introduction of gaseous pyridine (670 Pa) for 5 min at 25° C. to reach saturation;
5. desorption of pyridine at 25° C. under vacuum ($10^{-5}$ Pa) over a period of 30 min.

The spectra were standardized using the instrument software OPUS version 7.2 supplied by Bruker Optik GmbH as follows: baseline correction; the $SiO_2$ fingerprint peak at 1870 $cm^{-1}$ was scaled to 0.2 absorbance units (to normalise the spectra of different samples to the same mass of $SiO_2$).

Determination of the are Under the Peaks Between 1538 and 1559 $cm^{-1}$ and Between 1635 and 1612 $cm^{-1}$ The range in the infrared spectrum taken into consideration was from 1700 $cm^{-1}$ to 1400 $cm^{-1}$.

The determination of the area under the peaks in the identified regions of the IR spectrum was performed on the spectrum obtained at the end of step 5, as detailed above, using the integration function of the software OPUS version 7.2 supplied by Bruker Optik GmbH as follows: in the menu "set-up integration" the integration method B was selected and the integral calculated between the values of 1538 and 1559 $cm^{-1}$ and of 1612 and 1635 $cm^{-1}$ respectively. The value obtained by the software was recorded.

The calculation of the integral under the peak between 1538 and 1559 $cm^{-1}$ is outlined: the points on the infrared absorption curve corresponding to values 1538 $cm^{-1}$ and 1559 $cm^{-1}$ are identified and they are connected by a straight line passing through both points. The area underlying the absorption spectrum and comprised between said straight line and the absorption spectrum between 1538 $cm^{-1}$ and at 1559 $cm^{-1}$ is taken as the area under the peak.

EXAMPLES

Example 1

In a 25 L stainless steel reactor were introduced 16.7 L of purified water and 260 g of $Na_2SO_4$ (solid). The obtained solution was stirred and heated to reach 92° C. The entire reaction was carried out at this temperature. Sulfuric acid at a concentration of 7.7 wt % was introduced into the reactor to reach a pH value of 3.9. Then 161 g of a sodium aluminate solution ([Al]: 12.2 wt %, [$Na_2O$]: 19.9 wt %) was added.

The same sodium silicate solution ($SiO_2/Na_2O$ weight ratio=3.58; $SiO_2$ concentration=19.8 wt %) was used throughout the process. A sodium silicate solution at a flowrate of 109.7 g/min and a 7.7 wt % sulfuric acid solution at a flowrate of 148 g/min were simultaneously introduced over a 14 min period. At the end of this step, sodium silicate at a flowrate of 109.7 g/min and a 96 wt % sulfuric acid solution were introduced simultaneously over a period of 10 min. The 96 wt % sulfuric acid solution flowrate was regulated so that the pH of the reaction medium was maintained at a value of 4.0.

The introduction of acid was then stopped while the addition of sodium silicate was maintained at the same flowrate until the reaction medium reached the pH value of 8.0.

Sodium silicate at a flowrate of 172 g/min and a 96 wt % sulfuric acid solution were then introduced simultaneously over a period of 18.5 min. The flowrate of the 96% sulfuric acid solution was regulated so that the pH of the reaction medium was maintained at a value of 8.0.

At the end of this simultaneous addition, the pH of the reaction medium was brought to a value of 4.8 with 96 wt % sulfuric acid. The reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica S1.

The properties precipitated silica S1 are reported in Table I.

Example 2

In a 25 L stainless steel reactor were introduced 15.7 L of purified water and 244 g of $Na_2SO_4$ (solid). The obtained solution was stirred and heated to reach 92° C. The entire reaction was carried out at this temperature. Sulfuric acid at a concentration of 7.7 wt % was introduced into the reactor to reach a pH value of 3.9.

A sodium silicate solution ($SiO_2/Na_2O$ weight ratio=3.4; $SiO_2$ concentration=19.3 wt %) at a flowrate of 109.5 g/min was introduced in the reactor over a period of 45 s. The same sodium silicate solution was used throughout the process.

Next a sodium silicate solution at a flowrate of 109.5 g/min, and a 7.7 wt % sulfuric acid solution were simultaneously introduced over a 2 min period to reach pH 4.0. Next sodium silicate solution at a flowrate of 109.5 g/min, a sodium aluminate solution ([Al]: 12.2 wt %, [$Na_2O$]: 19.9 wt %) at a flowrate of 8.8 g/min and a 7.7 wt % sulfuric acid solution were simultaneously introduced over 13 min period. The flowrate of sulfuric acid was regulated so that the pH of the reaction medium was maintained at a value of 4.0. The addition of sodium aluminate was terminated when the amount of silicate added to the reaction medium was 46% of the total amount.

The introduction of acid and of sodium aluminate was then stopped while the addition of sodium silicate was continued at the same flowrate until the reaction medium reached the pH value of 8.0.

Sodium silicate at a flowrate of 172 g/min and a 96 wt % sulfuric acid solution were then introduced simultaneously over a period of 18 min.

The flowrate of the 96 wt % sulfuric acid solution was regulated so that the pH of the reaction medium was maintained at a value of 8.0.

At the end of this simultaneous addition, the pH of the reaction medium was brought to a value of 4.8 with 96 wt % sulfuric acid. The reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica S2.

The properties precipitated silica S2 are reported in Table I.

Example 3—Catalytic Activity of Silica S1

The catalytic test used for the testing the catalytic properties of the inventive silica was described by Pernot et al. in Applied Catalysis, 1991, vol. 78, p. 213. In the case of the silica of the invention the test monitored the transformation of 2-methyl-3-butyn-2-ol to 3-methyl-3-buten-1-yne, following the procedure described hereafter.

An amount of 100 mg of silica was placed in a Pyrex reactor. The silica was subjected to a pretreatment at 180° C. for 2 h under a $N_2$ gas flow at a flow rate of 20 mL/min.

The temperature in the reactor was set at 180° C. Given amounts of 2-methyl-3-butyn-2-ol were periodically injected into the reactor by feeding, over the course of 2 minutes, a mixture of 1.73 kPa of 2-methyl-3-butyn-2-ol in $N_2$ with a flow rate of 20 mL/min, which corresponds to an hourly molar flow rate of 2-methyl-3-butyn-2-ol of 0.85 mmol/h.

At the end of each injection, the gas stream at the reactor outlet was analysed by gas chromatography to determine the nature of the reaction products and their amount.

The degree of conversion ($DC_t$) of 2-methyl-3-butyn-2-ol during the test at a given time (t) was calculated according to the following formula:

$$DC_t = (C_{ini} - C_t)/C_{ini}$$

where $C_{ini}$ is the amount of 2-methyl-3-butyn-2-ol before the reaction and $C_t$ represents the amount of 2-methyl-3-butyn-2-ol at the time t of the reaction.

The intrinsic activity (At) during the test at a given time (t), expressed in mmol/h/m$^2$, can be defined from the degree of conversion $DC_t$, (expressed as %), the hourly molar flow rate of the 2-methyl-3-butyn-2-ol (Q, expressed in mmol/h) and the specific surface of the composition ($S_{BET}$, expressed in m$^2$/g), according to the following relationship:

$$At = 10 DC_t \times Q/S_{BET}.$$

The selectivity ($S_i$) for the conversion of 2-methyl-3-butyn-2-ol into 3-methyl-3-buten-1-yne, defined as the proportion of 3-methyl-3-buten-1-yne in the gaseous stream at the exit of the reactor with respect to the total amount of products identified in said gaseous stream, was calculated according to the following formula:

$$S_i = C_i/\Sigma_i$$

where $C_i$ is the amount of the product i and Σ represents the sum of the reaction products identified by gas chromatography in the gaseous stream at the exit of the reactor.

The test was performed using inventive silica S1 in comparison with a precipitated silica (Zeosil® Premium 200MP, having a $S_{BET}$ of 211 m$^2$/g and an amount of Al of about 0.9 mol %) commercially available from Solvay) whose infrared spectrum measured after chemisorption with pyridine to saturation followed by treatment under vacuum at 25° C. does not exhibit any peak between 1538 and 1559

TABLE I

| | $S_{BET}$ (m²/g) | $S_{CTAB}$ (m²/g) | Al (% mol) | Area of peak between 1538 and 1559 cm$^{-1}$ | Area of peak between 1612 and 1635 cm$^{-1}$ | (Area of peak between 1538 and 1559 cm$^{-1}$)/ (Area of peak between 1612 and 1635 cm$^{-1}$) |
|---|---|---|---|---|---|---|
| S1 | 218 | 105 | 3.1 | 0.15 | 0.11 | 1.36 |
| S2 | 194 | 89 | 3.1 | 0.16 | 0.09 | 1.78 | cm$^{-1}$ and hence has a ratio (area under the peak between 1538 and 1559 cm$^{-1}$)/(area under the peak between 1612 and 1635 cm$^{-1}$) equal to 0.

After 30 minutes of reaction the following was observed:

|  | S1 | Zeosil ® Premium 200MP |
|---|---|---|
| $A_t$ (mmol/h/m$^2$) | 0.014 | 0.008 |
| Selectivity $S_{(3-methyl-3-buten-1-yne)}$ | 96% | 90% |

The silica of the invention exhibits a higher degree of conversion of the starting material, 2-methyl-3-butyn-2-ol, as well as a higher selectivity in the target product (3-methyl-3-buten-1-yne) with respect to the silica of the prior art.

The results show that the inventive silica having acid sites has a higher catalytic activity with respect to the conversion of 2-methyl-3-butyn-2-ol into 3-methyl-3-buten-1-yne.

Example 4—Comparative Example 1

Elastomeric compositions were prepared in an internal mixer of Brabender type (70 mL) using inventive silica S2 in comparison with a precipitated silica (Zeosil® 1115MP ground to powder, having a $S_{BET}$ of 113 m$^2$/g and an amount of Al of about 0.9 mol %) commercially available from Solvay) whose infrared spectrum measured after chemisorption with pyridine to saturation followed by treatment under vacuum at 25° C. does not exhibit any peak between 1538 and 1559 cm$^{-1}$ and hence has a ratio (area under the peak between 1538 and 1559 cm$^{-1}$)/(area under the peak between 1612 and 1635 cm$^{-1}$) equal to 0.

The compositions, expressed as parts by weight per 100 parts of elastomers (phr), are described in Table II below:

TABLE II

| Composition | Example 4 | Comp. Ex. 1 |
|---|---|---|
| f-sSBR | 80.0 | 80.0 |
| BR | 20.0 | 20.0 |
| Zeosil ® 1115MP |  | 80.0 |
| S2 | 80.0 |  |
| Carbon black (N330) | 3.0 | 3.0 |
| TESPD | 2.8 | 3.5 |
| Stearic acid | 2.0 | 2.0 |
| TDAE oil | 35.0 | 35.0 |
| ZnO | 2.5 | 2.5 |
| 6-PPD | 1.9 | 1.9 |
| Sulfur | 1.7 | 1.7 |
| CBS | 2.0 | 2.0 |
| DPG | 1.5 | 1.5 |

F-sSBR: functionalized solution SBR SPRINTAN ® SLR-4602 from Trinseo with 62% of vinyl units; 21% of styrene units, Tg of −25%
BR: Butyl Rubber Buna CB 25 from Lanxess
TESPD: Bis[3-(triethoxysilyl)propyl]disulphide, Xiameter Z-6920 from Dow Corning
TDAE oil, Vivatec 500 from Hansen & Rosenthal KG
6-PPD: N-(1,3-dimethylbutyl)-N-phenyl-para-phenylenediamine, Santoflex 6-PPD from Flexsys
CBS: N-cyclohexyl-2-benzothiazolesulfenamide, Rhenogran CBS-80 from RheinChemie
DPG: diphenylguanidine, Rhenogran DPG-80 from RheinChemie Process for the Preparation of the Rubber Compositions The process for the preparation of the rubber compositions was performed in two successive preparation phases The first phase was carried out using a mixing device, of internal mixer type, of Brabender brand (capacity of 70 mL). The initial temperature and the speed of the rotors were set so as to achieve mixture dropping temperatures between 130° C. and 160° C.

In a first pass of the first phase the elastomers and the reinforcing filler (introduction in installments) were mixed with the coupling agent, the oil and the stearic acid. The duration was between 6 and 9 minutes.

After cooling the mixture (temperature of less than 100° C.), a second pass made it possible to incorporate the zinc oxide and the protecting agents/antioxidants. The duration of this pass was between 2 and 5 minutes.

After cooling the mixture (temperature of less than 100° C.), the vulcanization system were added during the second phase. It was carried out on an open mill, preheated to 50° C. The duration of this phase was between 2 and 6 minutes.

Each final mixture was subsequently calendered in the form of plaques with a thickness of 2-3 mm.

Mechanical Properties of the Vulcanisates

The measurements were carried out after vulcanization at 160° C.

Uniaxial tensile tests were carried out in accordance with the instructions of the standard NF ISO 37 with test specimens of H2 type at a rate of 500 mm/min on an Instron 5564 device. The results are reported in Table III.

TABLE III

|  | Example 4 | Comp. Ex. 1 |
|---|---|---|
| Tensile strength (Mpa) | 17.3 | 15.5 |
| Elongation at break (%) | 464 | 387 |
| Energy at break (J) | 2.8 | 2.1 |

The results in Table III show that elastomeric compositions containing the inventive silica S2 have improved mechanical properties with respect to known precipitated silica.

The invention claimed is:

1. Precipitated silica comprising silica and at least one element M selected from the group consisting of B, Al, Ga and mixtures thereof,
   the at least one element M being contained in said precipitated silica in an amount in a range of from 0.5 to 30.0 mol % with respect to the silica;
   the precipitated silica being characterized by an infrared absorption spectrum having at least one peak between 1538 and 1559 cm$^{-1}$ and at least one peak between 1612 and 1635 cm$^{-1}$, said spectrum having been measured after chemisorption with pyridine to saturation followed by treatment under vacuum at 25° C., wherein the area under the peak between 1538 and 1559 cm$^{-1}$ is at least 0.05 cm$^{-1}$, the area under the peak between 1612 and 1635 cm$^{-1}$ is at least 0.04 cm$^{-1}$ and the ratio (area under the peak between 1538 and 1559 cm$^{-1}$)/(area under the peak between 1612 and 1635 cm$^{-1}$) is at least 1.20.

2. The precipitated silica of claim 1 wherein the area under the peak between 1538 and 1559 cm$^{-1}$ is at least 0.07 cm$^{-1}$.

3. The precipitated silica of claim 1 wherein the at least one element M is Al.

4. The precipitated silica of claim 1 characterized by a BET surface area from 40 to 800 m$^2$/g.

5. A process for preparing the precipitated silica of claim 1, the process comprising a reaction of a silicate with an acid in a reaction medium to produce a suspension of precipitated silica, said reaction comprising at least one step wherein either a silicate or at least one compound of element M is added to the reaction medium while the reaction medium is at a pH in the range from 2.0 to 6.0, and wherein the at least one compound of element M is added to the reaction medium before 50% by weight of the total amount of silicate is added thereto.

6. The process of claim 5, said process comprising:
(i) providing a starting solution having a pH equal to or greater than 7.0;
(ii) reducing the pH of the reaction medium to a value lower than 7.0 by either simultaneously adding a silicate and an acid or by adding an acid to said starting solution; and
(iii) simultaneously adding to the reaction medium a silicate and an acid, such that the pH of the reaction medium is maintained in the range from 2.0 to 6.0 to obtain a suspension of precipitated silica,
wherein at least one compound of element M is added to the reaction medium during at least one of steps (i), (ii) and (iii) with the proviso that such addition takes place before 50% by weight of a total amount of silicate has been added to the reaction medium.

7. The process of claim 6 further comprising the steps of:
(iv) increasing the pH of the reaction medium at the end of step (iii) to a value equal or greater than 7.0;
(v) simultaneously adding an acid and a silicate in such a way that the pH of the reaction medium is maintained in the range from 7.0 to 10.0; and
(vi) stopping the addition of silicate while continuing the addition of acid to reach a pH of the reaction medium of less than 6.0.

8. The process of claim 6 wherein the at least one compound of metal M is added to the reaction medium in at least one of stages (i), (ii), (iii) or (iv).

9. The process of claim 6 wherein the at least one compound of metal M is added to the reaction medium in stage (i) or (ii).

10. The process of claim 5 wherein the at least one compound of metal M is sodium aluminate.

11. A composition comprising the precipitated silica of claim 1 and at least one polymer.

12. An article comprising the composition of claim 11.

13. The article of claim 12 in the form of a footwear sole, floor covering, gas barrier, roller for cableways, seal for domestic electrical appliances, seal for liquid or gas pipes, braking system seal, pipe, sheathing, cable, engine support, battery separator, conveyor belt, or transmission belt.

14. A catalyst, catalyst support, thermal insulation material, resorcinol-formaldehyde/silica composite, absorbent for active materials, additive for toothpaste, concrete or paper comprising the precipitated silica of claim 1.

15. The precipitated silica of claim 4 characterized by a BET surface area from 50 to 450 $m^2/g$.

16. The process of claim 5 wherein either the silicate or the at least one compound of element M is added to the reaction medium while the reaction medium is at a pH in the range from 3.0 to 5.0.

17. The process of claim 7 wherein, in step (v), the pH of the reaction medium is maintained in the range from 7.5 to 9.5.

18. The composition of claim 11 wherein the polymer is an elastomer.

19. The precipitated silica of claim 1 wherein the ratio (area under the peak between 1538 and 1559 $cm^{-1}$)/(area under the peak between 1612 and 1635 $cm^{-1}$) is at least 1.30.

* * * * *